United States Patent [19]

Kitaori et al.

[11] Patent Number: 4,711,676

[45] Date of Patent: Dec. 8, 1987

[54] CARBURIZED PIN FOR CHAIN

[75] Inventors: Tadahiro Kitaori; Tsutomu Haginoya, both of Iruma; Nobuto Kozakura, Hanno, all of Japan

[73] Assignee: Tsubakimoto Chain Company, Osaka, Japan

[21] Appl. No.: 890,866

[22] Filed: Jul. 28, 1986

[51] Int. Cl.$^4$ .............................................. C22C 38/22
[52] U.S. Cl. ..................................... 148/319; 148/902
[58] Field of Search ....................... 148/319, 334, 902; 420/105, 123

[56] References Cited

U.S. PATENT DOCUMENTS 3,912,551 10/1975 Araya .................................. 148/31.5
4,249,961 2/1981 Nevalainen .......................... 148/14

FOREIGN PATENT DOCUMENTS 38669 8/1982 Japan.
60422 12/1982 Japan.

Primary Examiner—Christopher W. Brody
Attorney, Agent, or Firm—Dann, Dorfman, Herrell and Skillman

[57] ABSTRACT

A surface hardened pin for a chain is made from a ferrous alloy containing manganese, silicon, chromium, molybdenum and about 0.1 to 0.4% carbon, with the balance essentially iron. The layer is formed of ferrous material containing chromium and 0.6 to 0.9% carbon and has a plurality of carbide particles dispersed therethrough. The hardened surface layer is formed by gas carburizing the pin.

4 Claims, No Drawings

CARBURIZED PIN FOR CHAIN

FIELD OF THE INVENTION

The present invention relates to coupling pins for link plates of a chain and a method of hardening the same.

BACKGROUND OF THE INVENTION

Conventional pins for a chain have been provided with an abrasion-resistant surface and a tough core part by chromizing pin blanks containing from 0.4 to 0.7% by weight of carbon in a ferrous alloy to form a high-hardness chromium layer at the surface while forming fine crystal grains in the core part, as disclosed in, for example, Japanese Patent Publications No. 57-38669 (1982) and No. 57-60422 (1982).

However, because of the high carbon content of not lower than 0.4% by weight of the pin blanks, plastic working of the pin blanks could not be easily carried out and, upon heat treatment, the hardening effect penetrated into the core part of the pin blanks. Hardening normally reduces the toughness, i.e. rupture strength or cuttability, so that improvement of rupture strength could not be expected.

On the other hand, when the surface of a blank composed of a ferrous alloy with a carbon content of less than 0.4% by weight is chromized, formation of cyrstals of metal carbides in the surface layer is slight and, therefore, a high-hardness surface layer cannot be formed.

SUMMARY OF THE INVENTION

To overcome the above-mentioned drawbacks of the conventional pin blanks, the present invention provides a pin formed from a pin blank of a ferrous alloy whose core part has such a low carbon content that a hardening effect does not penetrate into the core part whereas the surface has such a high carbon content that crystals of metal carbides are sufficiently formed upon chromization of the surface.

The present invention resides in a pin comprising a chromium layer with a large number of metal carbide particles dispersed therein at the surface thereof, which is obtained by carburizing the surface of a pin blank containing not less than 0.1% by weight and less than 0.4% by weight of carbon and further containing manganese, silicon, chromium and molybdenum, the balance being iron and impurities, to form a high-carbon surface layer having a carbon content of not less than 0.6% by weight, and chromizing the thus carburized pin blank.

DESCRIPTION OF THE INVENTION

According to the present invention, the pin, whose surface has a high carbon content of not less than 0.6% by weight, shows an enhanced abrasion resistance due to the formation of a high-hardness surface layer with a large number of metal carbide particles dispersed therein, upon chromizing treatment. In addition, because the core part has a low carbon content of not less than 0.1% by weight and less than 0.4%, a hardening effect does not penetrate into the core part to lower the toughness.

WORKING EXAMPLE

A working example of the invention will be described.

Pin blanks containing from 0.33 to 0.38% by weight of carbon, from 0.60 to 0.85% by weight of manganese, from 0.15 to 0.35% by weight of silicon, from 0.90 to 1.20% by weight of chromium and from 0.15 to 0.30% by weight of molybdenum, the balance being iron and impurities, were carburized in a gas carburizing furnace at 850° to 870° C. and hardened to form a high-carbon surface layer having a carbon content of from 0.6 to 0.9% by weight, were then chromized by heating to 1000° C. for 10 hours in a powder rack method to form a chromium layer with a large number of metal carbide particles dispersed in the high-carbon surface layer, and were hardened at 850° to 870° C., followed by tempering at 240° to 260° C. to produce pins for a chain.

Since molybdenum has a property of forming a carbide stabler than the carbide of chromium, part of molybdenum diffuses into the chromium layer during chromizing to form a stable metal carbide.

Therefore, in the chromium layer, which is high in toughness, formed at the surface of the pin, a large number of grains of hard and particulate chromium carbide and extremely hard and fine particulate molybdenum carbide or composite carbides thereof are dispersely present, so that the pin surface has excellent abrasion resistance.

The data with respect to the working examples of the present invention were as follows:

| | |
|---|---|
| Diameter of pin: | 3.275 to 3.750 mm |
| Thickness of surface layer: | 0.013 to 0.016 mm |

In addition, since the core part of the pin is not affected by carburization hardening, it retains toughness as well as sufficient strength, and shows sufficient endurance to bending, shearing and other external forces.

The carbon content of the surface of the pin blank after carburizing is limited to within the range of from 0.6 to 0.9% by weight, because a carbon content of less than 0.6% by weight is insufficient to form hard metal carbides in chromizing, whereas a carbon content of more than 0.9% by weight leads to a lowering in toughness. The carbon content of the pin blank before carburizing is limited to within the range of from 0.33 to 0.38% by weight leads to a large amount of shear drop in cutting a pin blank from a steel bar by a cutting machine, resulting in marked reduction in the use life of the cutting tool, whereas a carbon content of more than 0.38% by weight leads to a lowering in the rupture strength of the chain pin under impact load.

Experimental data of cuttability, surface hardness after chromizing and Charpy impact value on the pin according to the present invention will be shown below in comparison with those data on a prior art pin.

TABLE I

| | (1) Cuttability: | |
|---|---|---|
| | Carbon content (%) | Cutting tool use life up to 0.3 mm shear lip in cutting blank by cutting machine |
| Pin of present invention | 0.33–0.38 | 80,000–100,000 hr |
| Pin of prior art | 0.55–0.61 | 10,000–15,000 hr |

As shown in the above table, the tool use life is improved to about 7 to 8 times that in cutting prior art pin blanks.

TABLE II

| | (2) Surface hardness after chromizing: | | |
|---|---|---|---|
| | Carbon content (%) | Carburization before chromizing | Hardness after chromizing, Hmv |
| Pin of present invention | 0.33–0.38 | conducted | 1700–1800 |
| Pin of prior art | 0.55–0.61 | not conducted | 1700–1800 |

As shown in the above table, there is no substantial difference in surface hardness between the pin of the present invention and the prior art pin, and the pins have comparable abrasion resistance.

TABLE III

| (3) Charpy impact value: | |
|---|---|
| Pin of present invention | 8 kgm/cm$^2$ |
| Pin of prior art | 2 kgm/cm$^2$ |

The above experimental results show that although the pin according to the present invention is formed from a carbon steel of lower carbon content as compared to a carbon steel used for the prior art pins, the carburization provides the pin of the invention with abrasion resistance comparable to that of the prior art pins, and cuttability and rupture strength of the pin is remarkably enhanced as compared to the prior art pins.

As mentioned earlier, the data with respect to the working examples were as follows:

| Diameter of pin: | 3.275 to 3.750 mm |
|---|---|
| Thickness of surface layer: | 0.013 to 0.016 mm |

SUMMARY

According to the present invention, a pin blank of a low carbon steel with a carbon content of from 0.33 to 0.38% by weight is chromized after the surface thereof is subjected to carburization hardening to form a high-carbon surface layer having a carbon content of from 0.6 to 0.9% by weight, whereby an abrasion-resistant layer with comparable hardness to that of prior art is formed on the surface of the pin. In addition, since the core part of the pin is formed of a low carbon steel, the cuttability and rupture strength are remarkably enhanced as compared to prior art pins containing from 0.4 to 0.7% by weight of carbon. Accordingly, the pin according to the present invention has excellent effects as coupling pins for link plates of a chain.

We claim:

1. A surface hardened pin for a chain comprising
   a core formed of a ferrous alloy containing manganese, silicon, chromium, molybdenum, about 0.1 to 0.4% carbon, and the balance essentially iron; and
   a hardened surface layer formed on said core, said hardened surface layer containing chromium and 0.6 to 0.9% carbon and having a plurality of carbide particles dispersed therethrough.

2. A surface hardened pin as recited in claim 1 wherein the core is formed of a ferrous alloy consisting essentially of about 0.60–0.85% manganese, 0.15–0.35% silicon, 0.90–1.20% chromium, 0.15–0.30% molybdenum, and the balance essentially iron.

3. A surface hardened pin as recited in claim 1 wherein the carbide particles comprise chromium carbides and molybdenum carbides.

4. A surface-hardened pin as recited in claim 1 wherein the core is formed of a ferrous alloy containing about 0.33–0.38% carbon.

* * * * *